US011290260B1

(12) United States Patent
Firestone et al.

(10) Patent No.: US 11,290,260 B1
(45) Date of Patent: Mar. 29, 2022

(54) KEY MANAGEMENT IN A SECURE DECENTRALIZED P2P FILESYSTEM

(71) Applicant: CyLogic, Inc., Chevy Chase, MD (US)

(72) Inventors: Adam Firestone, Alexandria, VA (US); Hilary L. MacMillan, Ashburn, VA (US); Raghu Lingampally, Hyderabad (IN)

(73) Assignee: CyLogic, Inc., Chevy Chase, MD (US)

( * ) Notice: Subject to any disclaimer, the term of this patent is extended or adjusted under 35 U.S.C. 154(b) by 0 days.

(21) Appl. No.: 17/398,337

(22) Filed: Aug. 10, 2021

Related U.S. Application Data

(60) Provisional application No. 63/226,241, filed on Jul. 28, 2021, provisional application No. 63/226,265, filed on Jul. 28, 2021, provisional application No. 63/170,331, filed on Apr. 2, 2021, provisional application No. 63/228,186, filed on Aug. 2, 2021.

(51) Int. Cl.
*H04L 9/08* (2006.01)
*H04L 9/32* (2006.01)

(52) U.S. Cl.
CPC ............ *H04L 9/0825* (2013.01); *H04L 9/085* (2013.01); *H04L 9/0863* (2013.01); *H04L 9/0869* (2013.01); *H04L 9/0894* (2013.01); *H04L 9/3213* (2013.01)

(58) Field of Classification Search
CPC ..... H04L 9/0825; H04L 9/085; H04L 9/0863; H04L 9/0869; H04L 9/0894; H04L 9/3213
See application file for complete search history.

(56) References Cited

U.S. PATENT DOCUMENTS

| 7,356,531 | B1 | 4/2008 | Popelka et al. |
| 7,802,310 | B2 | 9/2010 | Farber et al. |
| 8,001,096 | B2 | 8/2011 | Farber et al. |
| 9,363,247 | B2 | 6/2016 | Murray |
| 9,602,508 | B1 * | 3/2017 | Mahaffey ................ H04L 63/10 |
| 9,819,663 | B1 | 11/2017 | Gauda |
| 9,965,483 | B2 | 5/2018 | Beaverson et al. |
| 10,255,340 | B2 | 4/2019 | King, III et al. |

(Continued)

OTHER PUBLICATIONS

Brian, et al. "JigDFS: A secure distributed file system." 2009 IEEE Symposium on Computational Intelligence in Cyber Security (2009).

*Primary Examiner* — Henry Tsang
(74) *Attorney, Agent, or Firm* — Kasha Law LLC; John R. Kasha; Kelly L. Kasha

(57) ABSTRACT

A primary input value is received from a first user on a first peer device. A symmetric user encryption key UK1 is generated for the first user from the primary input value on the first peer device. One or more random numbers are requested and received from a random number generator server. A user asymmetric encryption key pair that includes a public key PuK1 and a private key PrK1 is generated for the first user from the one or more random numbers on the first peer device. The public key PuK1 is stored in a non-volatile memory on a public-key server. The private key PrK1 is encrypted using the symmetric user encryption key UK1 using a symmetric encryption algorithm on the first peer device, producing an encrypted private key ePrK1=$ES_{UK1}$(PrK1). The private key ePrK1 is stored in non-volatile memory on a data persistence server.

10 Claims, 10 Drawing Sheets

(56) References Cited

U.S. PATENT DOCUMENTS

| | | | |
|---|---|---|---|
| 2003/0204732 A1* | 10/2003 | Audebert | H04L 9/3226 713/182 |
| 2015/0304315 A1* | 10/2015 | Estehghari | H04L 9/0825 713/156 |
| 2015/0310431 A1* | 10/2015 | Lakshmanan | G06Q 20/3226 705/71 |
| 2016/0197729 A1* | 7/2016 | Jones | H04L 9/3215 713/184 |
| 2020/0412525 A1* | 12/2020 | Katsak | G06F 16/1815 |

* cited by examiner

KEY MANAGEMENT IN A SECURE DECENTRALIZED P2P FILESYSTEM

RELATED APPLICATIONS

This application claims the benefit of U.S. Provisional Patent Application Ser. No. 63/226,241, filed on Jul. 28, 2021, the content of which is incorporated by reference herein in its entirety.

INTRODUCTION

The teachings herein relate to a decentralized or distributed filesystem. More particularly the teachings herein relate to systems and methods for generating and decrypting persistent user cryptographic keys in a peer-to-peer distributed file system. The systems and methods herein can be performed in conjunction with a processor, controller, or computer system, such as the computer system of FIG. 1.

Cryptographic Key Management

Modern computer networks have evolved around the notion of information and infrastructure centralization. While this paradigm offers some benefits in terms of physical and information security for data residing on an organization's servers, and a concentration of management resources, it has often been found lacking with respect to data durability and economy of operation. Additionally, if unauthorized parties gain access to the centralized servers, much of the organization's most valuable resource, its data holdings, are open to the attackers. In response to this, many organizations have opted to encrypt centrally managed data resources, using mechanisms that provide keys to authorized users on an as-needed basis. For security purposes, these keys are often stored and maintained in specialized equipment known as hardware security modules (HSM).

Unfortunately, the HSM suffers from many of the same drawbacks as the centralized storage of data resources. HSMs, which are inherently a specialized form of server, suffer from the same data durability issues as centralized file servers; that is, the HSM creates a single point of failure. If the HSM is rendered unavailable or inoperable, the organization(s) reliant on the keys residing on that device can find themselves permanently separated from their data holdings, with catastrophic results. Also, if an HSM is compromised by either a malicious insider or an external attacker, the organization's data resources are exposed to theft or other malicious activity. This problem is compounded when the organization makes use of cloud-based services including an HSM provided by the cloud service provider (CSP) who retains ultimate access to the cloud-based HSM being used by the organization.

One response to the shortcomings of the conventional, centralized file and encryption key management paradigm has been the development of the decentralized file system. Decentralized file systems ensure data durability by distributing information between all participants rather than in one central hub representing a single point of failure. They remedy availability issues resulting from either inadvertent action or attacks through the use of content-based addressing instead of conventional location-based addressing. Content-based addressing turns all participants into super-nodes that are simultaneously clients and servers, eliminating the need for centralized file management infrastructure, and enabling organizations that embrace decentralization to reduce or eliminate the associated hardware and personnel costs.

Despite their advantages, decentralized file systems have not enjoyed widespread adoption due to the fact that they do not provide adequate information confidentiality. That is, their underlying architecture ensures that all participants have access to all information at all times. This runs contrary to organizational requirements to safeguard data and control access. Solutions to this confidentiality shortcoming usually involve encryption of the data residing on decentralized nodes. However, this creates a key management issue of its own, forcing the organization to rely on centrally managed key storage mechanisms, which may include HSMs, with their attendant drawbacks as noted above. As a result, there exists an unmet need for systems and methods that allow for cryptographic key management in a distributed, decentralized, or P2P file system without forcing the organization to rely on centrally managed key storage mechanisms.

Decentralized File Systems

Modern computer networks have evolved around the notion of information and infrastructure centralization. While this paradigm has offered benefits in terms of physical and information security for data residing on an organization's servers, and a concentration of management resources, it has often been found lacking with respect to data durability and economy of operation. Regarding data durability, centralization creates a single point of failure. If the server or data center is rendered unavailable or inoperable, the organization(s) reliant on the information residing on that physical infrastructure can find themselves without access to their most critical resource. Additionally, the operational costs associated with information technology infrastructure, as well as the skilled professionals required to operate it, are very significant, and often pose a constraint on organizational goals and ambitions.

The response to the conventional paradigm has been the development of the decentralized file system. Decentralized file systems ensure data durability by distributing information between all participants rather than in one central hub that represents a single point of failure. They neutralize denial of availability attacks such as ransomware through the use of content-based addressing instead of conventional location-based addressing that mitigates or eliminates the attackers' return on investment (ROI). Content-based addressing turns all participants into super-nodes that are simultaneously clients and servers, eliminating the need for centralized file management infrastructure, and enabling organizations that embrace decentralization to reduce or eliminate the associated hardware and personnel costs.

Despite their advantages, decentralized file systems have not enjoyed widespread adoption due to the fact that they do not provide adequate information confidentiality. That is, their underlying architecture ensures that all participants have access to all information at all times. This runs contrary to organizational requirements to safeguard data and control access.

Instead, decentralized file systems have primarily be used for public file sharing. For example, BitTorrent is a popular peer-to-peer (P2P) public file-sharing protocol.

FIG. 2 is an exemplary diagram 200 showing how a file is publicly shared by a BitTorrent client application. For example, in order to share file 210 originally located only on client device 201, a BitTorrent client application of client device 201 divides file 210 into q equal length pieces or segments and hashes each segment with a unique cryptographic hash key or hash value, producing q cryptographic hash values. The BitTorrent client application of client device 201 then creates a descriptor file 211, called a torrent, for file 210 that uniquely identifies the file.

A cryptographic hash value is a bit array of fixed size that uniquely and mathematically represents the data of a file, for example. The cryptographic hash value is found from the data of the file using a mathematical algorithm. As a result, a reconstructed file, for example, can be verified by applying the mathematical algorithm to the data of the reconstructed file and then comparing the cryptographic hash value that is produced with the previous cryptographic hash value of the original file.

Descriptor file 211 includes at least two lists. The first list is a list of the q cryptographic hash values corresponding to the q equal length segments. The second list is a list of m tracker devices (servers) that keep track of client devices (peers) that include one or more of the segments of file 210.

To enable sharing of file 210, for example, descriptor file 211 is sent to the m tracker devices (not shown). Since no segments have been shared at this point, each of the m tracker devices is only aware that client device 201 includes all of the segments of file 210.

At time $t_1$, for example, a BitTorrent client application of client device 209 is looking for file 210 and finds file descriptor 211 on one of the m tracker devices or some other server device, or is sent torrent or file descriptor 211 by someone referring the user of client device 209 to file 210. File descriptor 211 additionally includes the filename of file 210 and metadata about file 210. File descriptor 211 can be found on a tracker or another server using a filename or piece of metadata. Using file descriptor 211 and information from the tracker, client device 209 learns that device 201 includes q segments of file 210 and requests all q segments from client device 201 since it is currently the only client to include any segment.

In response, the BitTorrent client application of client device 201 sends all q segments to client device 209. The BitTorrent client application of client device 209 then updates the m tracker devices to let them know that, in addition to client device 201, client device 209 now has a copy of all q segments of file 210. Finally, client device 209 reconstructs file 210 from the q segments of file 210 using the q cryptographic hash values of file descriptor 211.

At a later time $t_2$, for example, a BitTorrent client application of client device 202 is also looking for file 210 and finds file descriptor 211 on one of the m tracker devices. Using file descriptor 211 and information from the tracker, client device 202 learns that both devices 201 and 209 include q segments of file 210. The BitTorrent client application of client device 202 determines the most efficient method of obtaining the q segments of file 210 from devices 201 and 209. For example, client device 202 requests segment 1 from device 201 and segments 2 through q from device 209.

In response, the BitTorrent client application of client device 201 sends segment 1 to client device 202, and client device 209 sends segments 2 through q to client device 202. The BitTorrent client application of client device 202 then updates the m tracker devices to let them know that, in addition to client devices 201 and 209, client device 202 now has a copy of all q segments of file 210. Finally, client device 202 reconstructs file 210 from the q segments of file 210 using the q cryptographic hash values of file descriptor 211.

FIG. 2 illustrates how a file is found and downloaded in BitTorrent using a tracker. In more recent versions of BitTorrent, peers or client devices can locate a torrent directly using a distributed hash table (DHT). A DHT is a lookup service with key-value pairs. In theory, the DHT is decentralized. In practice, it is typically located on one or two servers. To find the location of nearby (in the network sense) client devices that include the desired file, a client device queries the DHT using a hash of the torrent of the desired file. The returned list of client devices is then used to retrieve segments of the file.

Although popular for sharing publicly available information, BitTorrent is not suitable for use as a distributed file system because it lacks facilities for maintaining information confidentiality among users. Tahoe least-authority file store (Tahoe-LAFS) is an exemplary open-source distributed data store that is sometimes described as a distributed file system. Tahoe-LAFS includes a method for maintaining information confidentiality among users FIG. 3 is an exemplary diagram 300 showing how a file is securely stored in Tahoe-LAFS. File 310 is, for example, created on client device 301. Instead of storing file 310 on client device 301, Tahoe-LAFS sends unencrypted file 310 to secure hypertext transfer protocol (HTTPS) server 302 using a secure HTTPS connection to HTTPS server 302. HTTPS server 302 encrypts file 310 and then divides encrypted file 311 into m pieces or segments using erasure coding. Erasure coding allows file 311 to be reconstructed from some number of the m segments that is less than m. Each of the m segments is then distributed to a different server among servers 330.

When client 301 wants to retrieve file 310, it requests the file from HTTPS server 302. HTTPS server 302 then retrieves some number of the m segments that is less than m from servers 330, decodes the segments producing encrypted file 311, and decrypts file 311 producing file 310. File 310 is then returned to client 301 using a secure HTTPS connection from HTTPS server 302.

Tahoe-LAFS securely stores files but is not a P2P system. Instead, Tahoe-LAFS acts like a redundant array of inexpensive disks (RAID) system where servers are used in place of local storage or disk drives. Tahoe-LAFS is therefore not conducive to file sharing among client devices.

Cleversafe is another distributed data store that can be used as a distributed file system. Like Tahoe-LAFS, Cleversafe divides encrypted files into m pieces or segments using erasure coding and stores the segments on different servers. Additionally, Cleversafe uses unique object identifiers (IDs) to identify each file in the system. This allows Cleversafe to store files in a flat-file system rather than in a tree-like hierarchical structure, which is most commonly used by traditional file systems. A flat file system can allow more data to be stored.

Unfortunately, also like Tahoe-LAFS, Cleversafe is not a P2P system. It is again more similar to a RAID system, where servers are used in place of local storage or disk drives. It is, therefore, less useful for sharing files.

Further, Bian, J. and R. Seker. "JigDFS: A secure distributed file system." 2009 *IEEE Symposium on Computational Intelligence in Cyber Security* (2009): 76-82 (hereinafter the "Bian Paper") describes another problem with Tahoe-LAFS and Cleversafe. The Bian Paper suggests that the lack of anonymity or deniability in systems like Tahoe-LAFS and Cleversafe makes them less useful in commercial or business settings. For example, the use of central servers in Tahoe-LAFS and Cleversafe make it easier to track the owners or editors of certain files. As a result, it would be possible, for example, to link a file for anonymous feedback to its editors in these systems.

In response to this problem, the Bian Paper proposes the jigsaw distributed file system (JigDFS). JigDFS is a secure P2P distributed file system. According to the Bian Paper, the use of a fully P2P distributed system "eliminates the possible leakage of user information from a central server."

FIG. 4 is an exemplary diagram 400 showing how a file is securely stored in JigDFS. File 410 is, for example, created on client device 401. In order to save file 410, a client application of JigDFS on client device 401 prompts the user of client device 401 for a password, p, for file 410. The client application hashes p with a hash algorithm to produce hash value h(p). The client application then encrypts file 410 using the hash value h(p), producing encrypted file 411. The client application divides encrypted file 411 into n slices or segments using erasure coding. The client application also hashes hash value h(p) using the hash algorithm to produce hash value h(h(p)).

The client application of JigDFS on client device 401 sends each segment of the n segments to one of n different client devices 420. Along with each segment, the client application sends the hash value h(h(p)). In other words, the client application sends a segment and hash value pair to each client device of client devices 420.

A hash value is sent along with each segment because JigDFS uses a hashed-key chain algorithm to create a hierarchy tree for each file. In other words, JigDFS further segments the segments of a file in each level or layer of a hierarchy of client devices. Each subsequent layer of client devices stores segments of file segments stored in a previous layer. At each layer, segments of a layer segment are encrypted using the hash value sent with the layer segment.

Consequently, for example, segment 412 of the encrypted file is sent to client device 422 along with hash value h(h(p)). In turn, the client application of JigDFS on client device 422 encrypts segment 412 using hash value h(h(p)), producing doubly encrypted segment 413. The client application divides doubly encrypted segment 413 into m slices or segments using erasure coding. The client application also hashes hash value h(h(p)) using the hash algorithm to produce hash value h(h(h(p))).

The client application of JigDFS on client device 422 sends each segment of the m segments to one of m different client devices 440 in the next layer of client devices. Along with each segment, the client application sends the hash value h(h(h(p))).

This iterative segmenting of file segments continues until a desired file security level (FSL) is reached. Like the password, p, that starts the hierarchy of hash values, the FSL (not shown) is specified or input by the user who saves file 410 on client device 401.

Like BitTorrent, JigDFS can retrieve a file using a DHT. A hash value of each file, h(f), is stored with each segment of the file in the file indexing DHT. When a user requests the file using h(f), the file segments are retrieved from the bottom layer of the hierarchical tree of client devices and sent to the user's client device along routes described by the DHT. Eventually, the user's client device will receive enough segments to recover the encrypted file. The user will then enter the password, p, again to decrypt the reconstructed file using h(p).

Ultimately, sharing a file in JigDFS requires sharing the password, p, of the file. This can provide anonymity since it is not possible to determine the user of the password. It also, however, means that the confidentiality of any file is dependent on the confidentiality of the password. In other words, if the password ends up in the wrong hands, the file system has been breached and there is no way to identify who breached the system. In addition, strong passwords are notoriously difficult to remember and, therefore, often end up being saved using unsecure methods or systems such as an unsecure file.

U.S. Pat. No. 9,363,247 (hereinafter the "'247 Patent") is directed to a method of securely storing blocks of a file across many different storage resources of a computer cluster or cloud system. In the method of '247 Patent, an unencrypted file is saved by sending the unencrypted file to a computer cluster using a secure connection, as is done in Tahoe-LAFS. A computing resource of the computer cluster then divides the file into n blocks, generates a different symmetric key for each block, and then encrypts each block using its symmetric key.

The computing resource of the computer cluster can save each encrypted block of the n blocks on a different storage resource of the computer cluster. Along with each encrypted block, the computer resource stores an encrypted version of the symmetric key used to encrypt the block. The symmetric key is encrypted using a symmetric user key. This encrypting of a key with another key can be referred to as key-wrapping.

In the method of the '247 Patent, a user obtains a user key from a key manager that is separate from but securely connected to the computer cluster or as part of the computer cluster. A user obtains a user key to store or gain access to a file. When a file is stored, the symmetric key of each encrypted block is encrypted with a user key of the user storing the file, and the wrapped key is stored with the encrypted block.

If the file is to be shared among a group of k users including the user saving the file, for example, the computer resource of the computer cluster encrypts the symmetric key of each encrypted block with each of the user keys of the k users, producing k wrapped keys. The computer resource reconstructs the file for a user of the group of k users by first decrypting the wrapped key for the user of each encrypted block, producing the symmetric key for each encrypted block. Each encrypted block is then decrypted, and the decrypted blocks are reconstructed to produce the file for the user.

The method of the '247 Patent describes using a semi-trusted client threat model. Essentially, this means that a user is authenticated using the secure connection to the computer cluster. As a result, the user can obtain the symmetric user key from the key manager and be verified via the secure connection.

The '247 Patent provides an improvement over JigDFS by allowing files to be shared without having to share a password. However, the use of the secure connection in the method of the '247 Patent to obtain symmetric user keys from a key manager makes the key wrapping technique of the '247 Patent unsuitable for a P2P distributed file system. In other words, relying on a secure connection between all peers in a P2P system in order to authenticate user keys significantly increases the complexity of the system. It also provides a point of failure and attack.

SUMMARY

Systems and methods are disclosed for generating persistent user cryptographic keys in a distributed P2P filesystem. The system includes a first peer device, a random number generator server, a public-key server, and a data persistence server.

The first peer device receives a primary input value from a first user. The first peer device generates a symmetric user encryption key UK1 for the first user from the primary input value. The first peer device requests and receives one or more random numbers from the random number generator server.

The first peer device generates a user asymmetric encryption key pair that includes a public key PuK1 and a private key PrK1 for the first user from the one or more random numbers. The first peer device stores the public key PuK1 in a non-volatile memory on the public-key server.

The first peer device encrypts the private key PrK1 using the symmetric user encryption key UK1 using a symmetric encryption algorithm, producing an encrypted private key ePrK1=$ES_{UK1}$(PrK1). The first peer device stores the private key ePrK1 in non-volatile memory on the data persistence server.

Systems and methods are disclosed for decrypting persistent user cryptographic keys in a distributed P2P filesystem. The system includes a first peer device and a data persistence server.

The first peer device receives a primary input value from a first user. The first peer device generates a symmetric user encryption key UK1 for the first user from the primary input value. The first peer device requests and receives an encrypted private key ePrK1 from a non-volatile memory of the data persistence server. The first peer device decrypts the encrypted private key ePrK1 using the symmetric user encryption key UK1 using a symmetric decryption algorithm, producing a private key PrK1=$ES_{UK1}^{-1}$(ePrK1).

These and other features of the applicant's teachings are set forth herein.

BRIEF DESCRIPTION OF THE DRAWINGS

The skilled artisan will understand that the drawings, described below, are for illustration purposes only. The drawings are not intended to limit the scope of the present teachings in any way.

Figure 1:
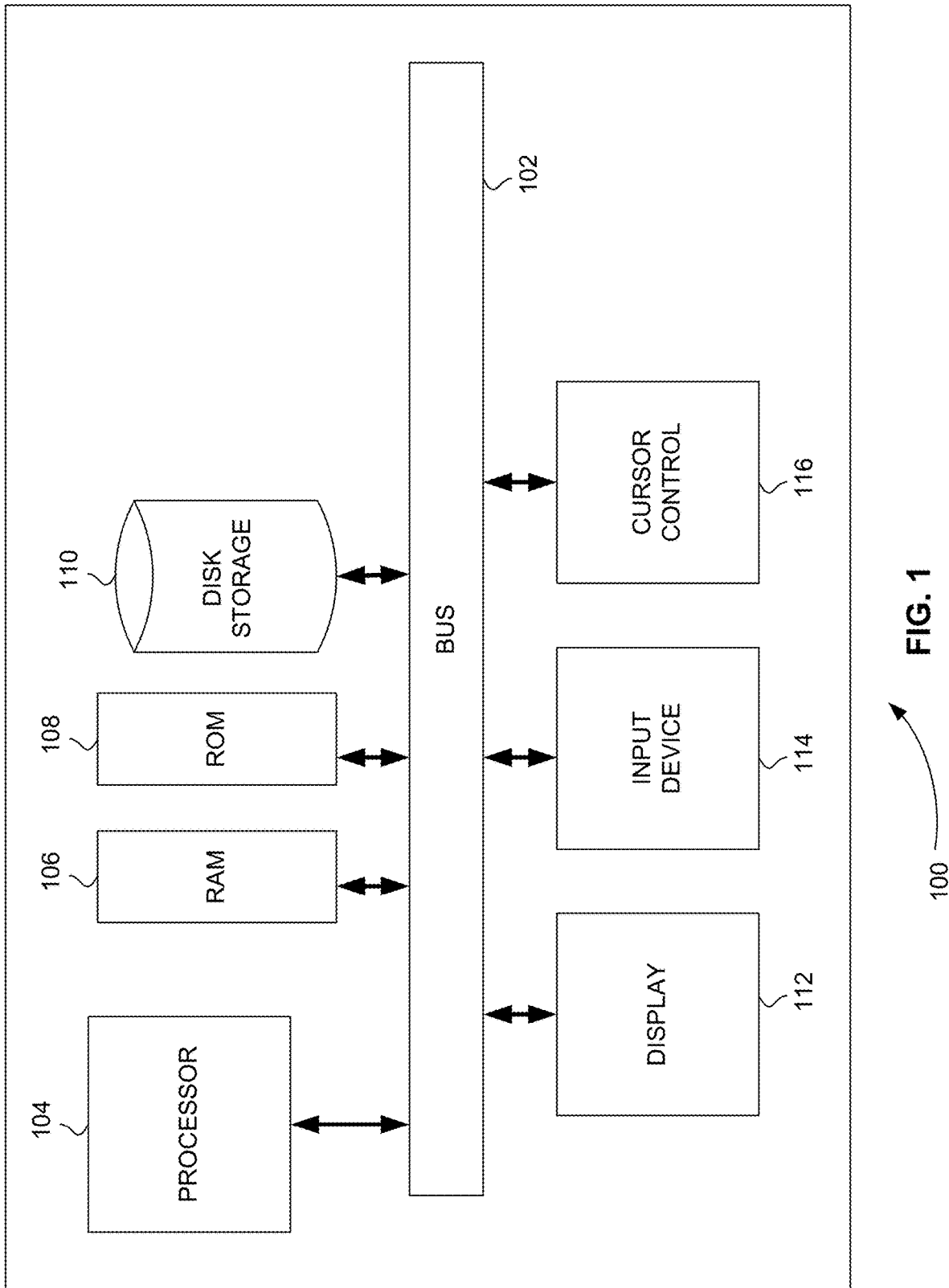
FIG. 1 is a block diagram that illustrates a computer system, upon which embodiments of the present teachings may be implemented.
Figure 2:
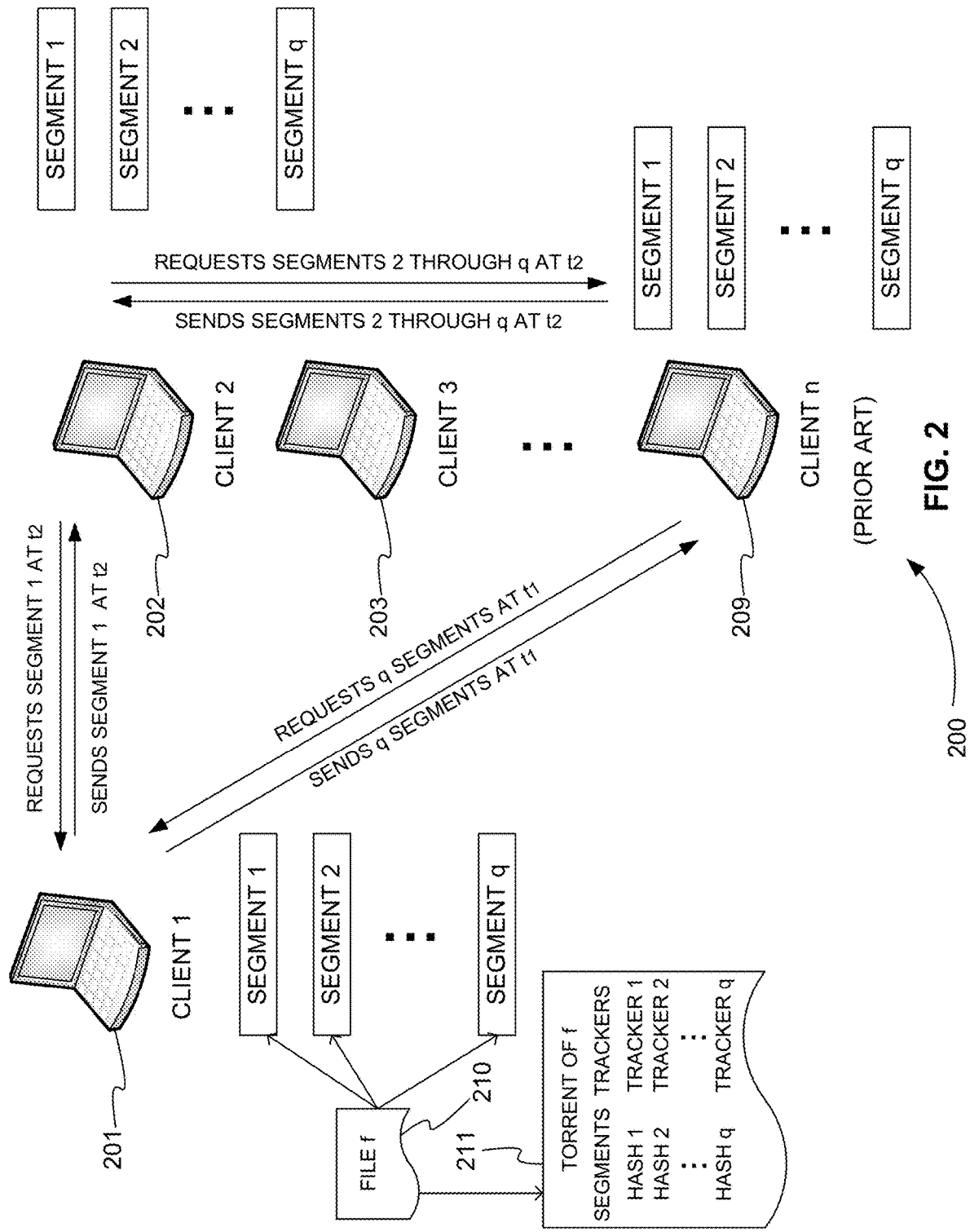
FIG. 2 is an exemplary diagram showing how a file is publicly shared by a BitTorrent client application.
Figure 3:
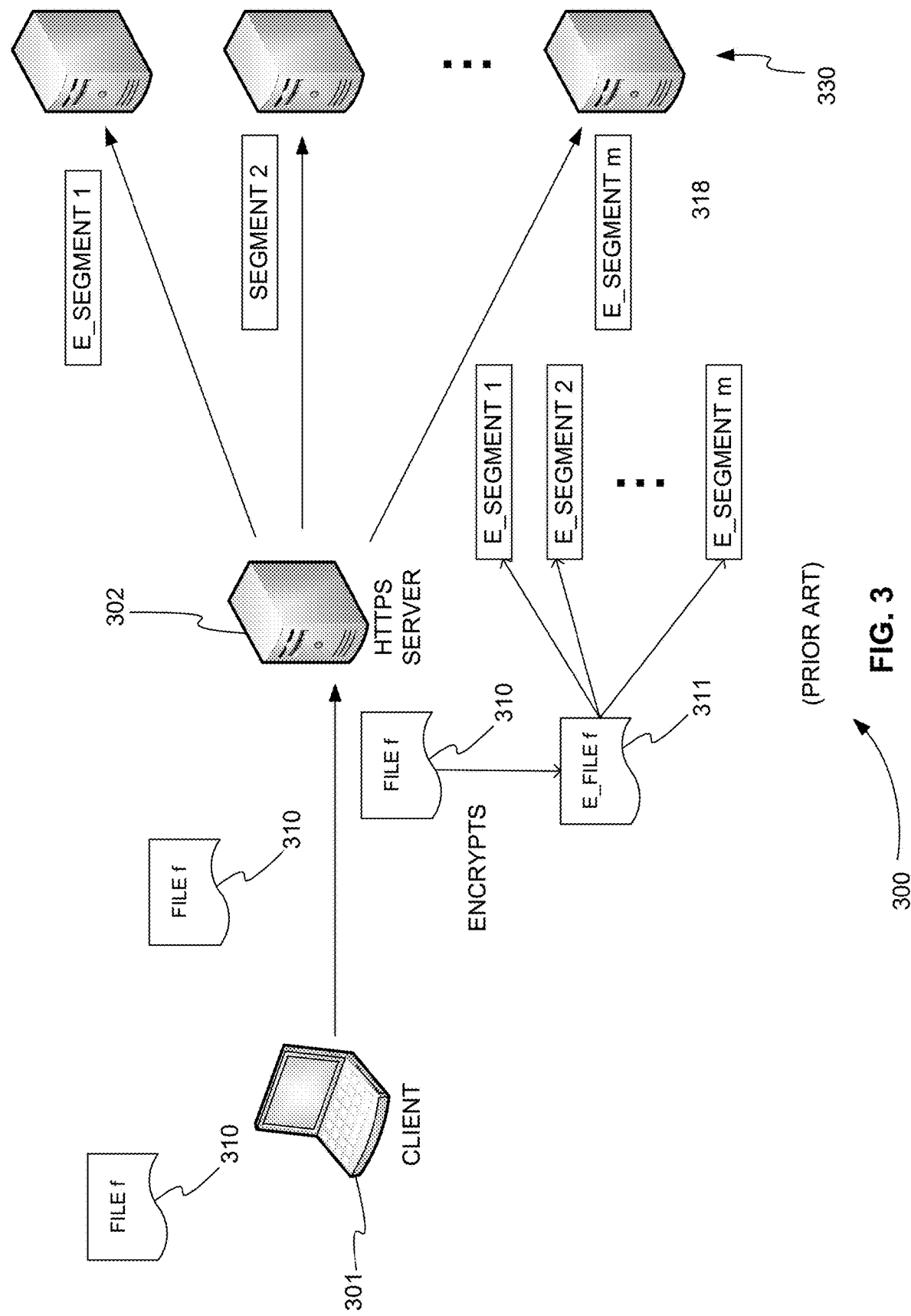
FIG. 3 is an exemplary diagram showing how a file is securely stored in Tahoe-LAFS.
Figure 4:
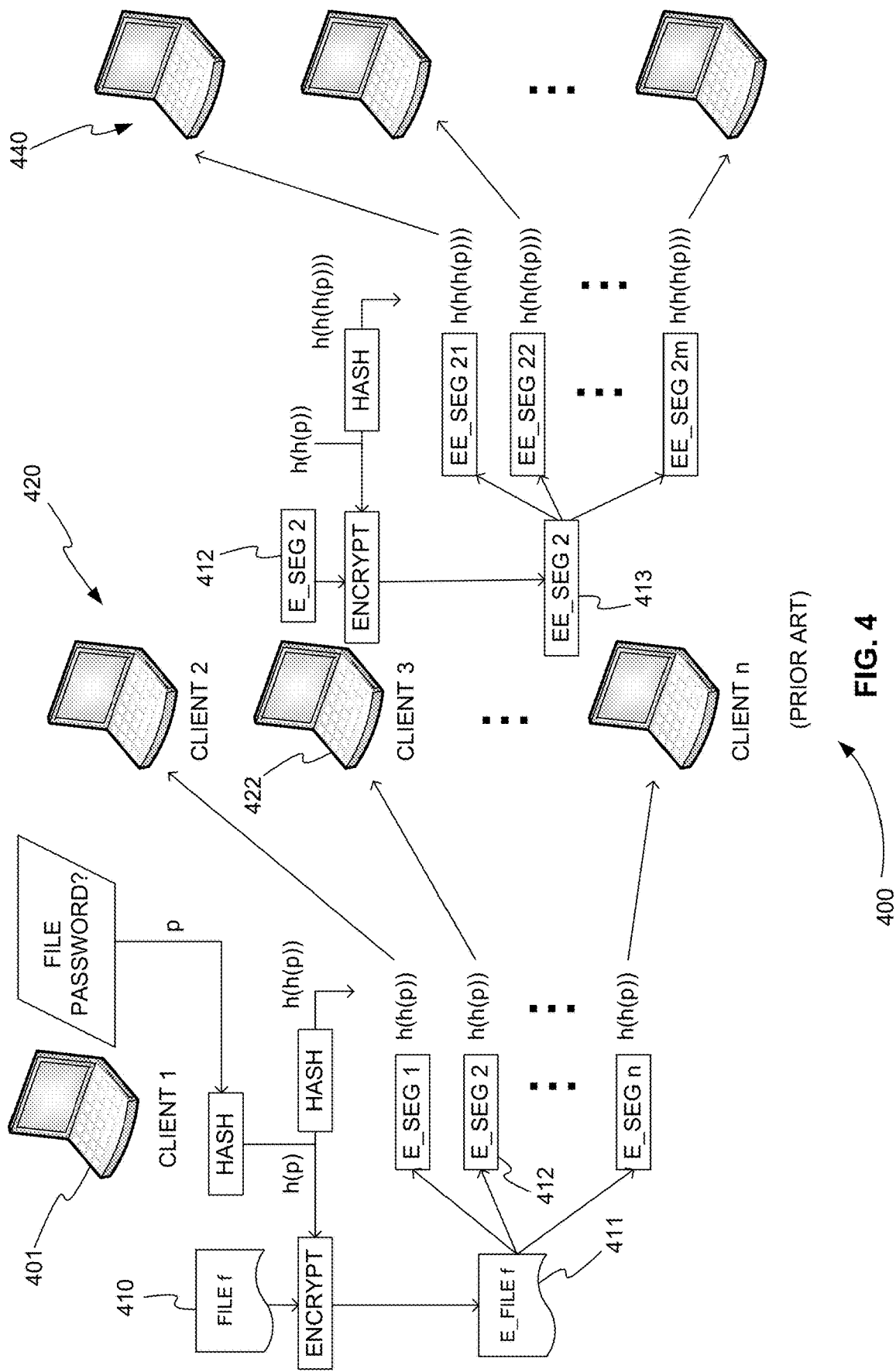
FIG. 4 is an exemplary diagram showing how a file is securely stored in JigDFS.

Before one or more embodiments of the present teachings are described in detail, one skilled in the art will appreciate that the present teachings are not limited in their application to the details of construction, the arrangements of components, and the arrangement of steps set forth in the following detailed description or illustrated in the drawings. Also, it is to be understood that the phraseology and terminology used herein is for the purpose of description and should not be regarded as limiting.

DESCRIPTION OF VARIOUS EMBODIMENTS

Computer-Implemented System

FIG. 1 is a block diagram that illustrates a computer system 100, upon which embodiments of the present teachings may be implemented. Computer system 100 includes a bus 102 or other communication mechanism for communicating information, and a processor 104 coupled with bus 102 for processing information. Computer system 100 also includes a memory 106, which can be a random-access memory (RAM) or other dynamic storage device, coupled to bus 102 for storing instructions to be executed by processor 104. Memory 106 also may be used for storing temporary variables or other intermediate information during execution of instructions to be executed by processor 104. Computer system 100 further includes a read only memory (ROM) 108 or other static storage device coupled to bus 102 for storing static information and instructions for processor 104. A storage device 110, such as a magnetic disk or optical disk, is provided and coupled to bus 102 for storing information and instructions.

Computer system 100 may be coupled via bus 102 to a display 112, such as a cathode ray tube (CRT) or liquid crystal display (LCD), for displaying information to a computer user. An input device 114, including alphanumeric and other keys, is coupled to bus 102 for communicating information and command selections to processor 104. Another type of user input device is cursor control 116, such as a mouse, a trackball or cursor direction keys for communicating direction information and command selections to processor 104 and for controlling cursor movement on display 112.

A computer system 100 can perform the present teachings. Consistent with certain implementations of the present teachings, results are provided by computer system 100 in response to processor 104 executing one or more sequences of one or more instructions contained in memory 106. Such instructions may be read into memory 106 from another computer-readable medium, such as storage device 110. Execution of the sequences of instructions contained in memory 106 causes processor 104 to perform the process described herein. Alternatively, hard-wired circuitry may be used in place of or in combination with software instructions to implement the present teachings. Thus, implementations of the present teachings are not limited to any specific combination of hardware circuitry and software.

The term "computer-readable medium" or "computer program product" as used herein refers to any media that participates in providing instructions to processor 104 for execution. The terms "computer-readable medium" and "computer program product" are used interchangeably throughout this written description. Such a medium may take many forms, including but not limited to, non-volatile media, volatile media, and precursor ion mass selection media. Non-volatile media includes, for example, optical or magnetic disks, such as storage device 110. Volatile media includes dynamic memory, such as memory 106.

Common forms of computer-readable media include, for example, a floppy disk, a flexible disk, hard disk, magnetic tape, or any other magnetic medium, a CD-ROM, digital video disc (DVD), a Blu-ray Disc, any other optical medium, a thumb drive, a memory card, a RAM, PROM, and EPROM, a FLASH-EPROM, any other memory chip or cartridge, or any other tangible medium from which a computer can read.

Various forms of computer readable media may be involved in carrying one or more sequences of one or more instructions to processor 104 for execution. For example, the instructions may initially be carried on the magnetic disk of a remote computer. The remote computer can load the instructions into its dynamic memory and send the instructions over a telephone line using a modem. A modem local to computer system 100 can receive the data on the telephone line and use an infra-red transmitter to convert the data to an infra-red signal. An infra-red detector coupled to bus 102 can receive the data carried in the infra-red signal and place the data on bus 102. Bus 102 carries the data to memory 106, from which processor 104 retrieves and executes the instructions. The instructions received by memory 106 may optionally be stored on storage device 110 either before or after execution by processor 104.

In accordance with various embodiments, instructions configured to be executed by a processor to perform a method are stored on a computer-readable medium. The computer-readable medium can be a device that stores digital information. For example, a computer-readable medium includes a compact disc read-only memory (CD-ROM) as is known in the art for storing software. The computer-readable medium is accessed by a processor suitable for executing instructions configured to be executed.

The following descriptions of various implementations of the present teachings have been presented for purposes of illustration and description. It is not exhaustive and does not limit the present teachings to the precise form disclosed. Modifications and variations are possible in light of the above teachings or may be acquired from practicing of the present teachings. Additionally, the described implementation includes software but the present teachings may be implemented as a combination of hardware and software or in hardware alone. The present teachings may be implemented with both object-oriented and non-object-oriented programming systems.

Cryptographic Key Management in a Distributed. Encrypted P2P System

As described above, managing cryptographic key material is a continuous challenge for enterprises of all types. Key management refers to the entire key lifecycle, including generation, exchange, storage, use, and destruction (rotation). With the advent of widely available true random number generation capability across platforms, moving the generation of cryptographic keys to the edge, or beyond the edge no longer presents either technical, operational, or security challenges. However, the exchange, storage, and use of keys continue to present challenges, including the creation of a single point of failure, the need to trust one or more systems administrators, and, in many cases, the need to trust external entities providing Cloud or other hosting services.

For example, if an organization opts to use a hardware security module (HSM) to store its cryptographic keys, it has opted into the non-trivial acquisition and ownership costs of the HSM and has assumed the risk that the systems administration personnel associated with the HSM are trustworthy. Additionally, if the HSM is unavailable for any reason (e.g., network outages, malicious activity, equipment failure), many parts, if not all, of the organization may be cut off from access to their data for unacceptably long periods of time.

Unfortunately, the HSM suffers from many of the same drawbacks as the centralized storage of data resources. Despite their advantages, decentralized file systems have not enjoyed widespread adoption due to the fact that they do not provide adequate information confidentiality. Solutions to this confidentiality shortcoming usually involve encryption of the data residing on decentralized nodes. However, this creates a key management issue of its own, forcing the organization to rely on centrally managed key storage mechanisms, which may include HSMs, with their attendant drawbacks as noted above.

As a result, there exists an unmet need for systems and methods that allow for cryptographic key management in a distributed, decentralized, or P2P file system without forcing the organization to rely on centrally managed key storage mechanisms.

Various embodiments remedy conventional key management shortcomings by decentralizing key storage, exchange, and use. The keys are securely associated with the data they are intended to protect, safeguarded from the threat posed by malicious or negligent administrators, and rendered highly available in a manner that mitigates the risk of a denial of service and reduces the infrastructural footprint required for effective and secure key management.

Various embodiments include a number of subcomponents, including a key derivation system, a key encryption system, a global public keyring, a file sharing system, a decentralized lookup service, and a content-addressed storage system. These subcomponents assure that keys are both random and unique, guarantee key confidentiality and integrity, provide a means to confidently share public keys, secure symmetric and asymmetric key sharing between geographically distributed parties, mitigate confidentiality and availability risk associated with single-point solutions such as HSMs, and guarantee data availability. The benefits of this key management system include improved security and availability of data, a reduction in infrastructure costs, a reduction in the size of the administrative trust perimeter, all delivered with the degree of information security required for operation in an enterprise, government, or academic environment. Various embodiments support secure and efficient management of cryptographic keys for both enterprise and individual operations.

User Symmetric Cryptographic Credential Generation

Figure 5:
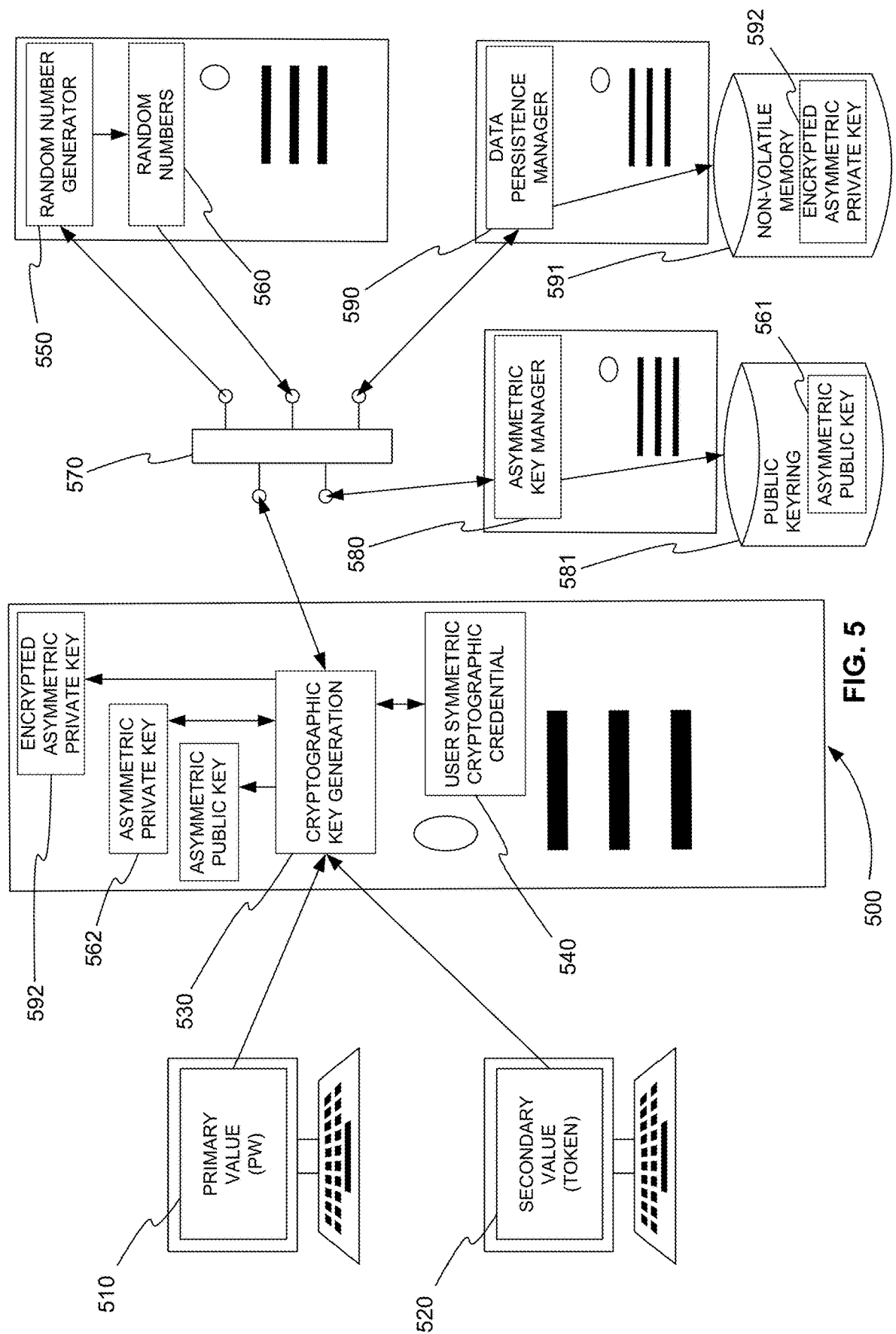
FIG. 5 is an exemplary diagram showing a method for generating a user symmetric cryptographic credential, in accordance with various embodiments.

FIG. 5 is an exemplary diagram 500 showing a method for generating a user symmetric cryptographic credential, in accordance with various embodiments. A user employs a data entry mechanism (keyboard) or a pointing and selection mechanism (mouse) to enter a primary value 510 of meaning to the user, such as a complex password or passphrase, into a cryptographic key generation module 530, the interface for which is shown on a display, for example. In various embodiments, the user enters a secondary value 520, such as the output of a shared secret token generator or the digitized information captured by a biometric sensor, for example.

The primary value 510 and secondary value 520 are subjected to a process by which a possibly weak key is made more secure against an exhaustive key search by increasing the resources (time and possibly space) required to test each possible key. This process is supported by and inherent to key generation module 530. The output of key generation module 530 is the user's symmetric cryptographic credential or user key 540. In various embodiments, user key 540 is, upon generation, used in conjunction with a symmetric key manager and an asymmetric key manager to encrypt the storage space in non-volatile memory managed by the symmetric key manager and the asymmetric key manager, respectively.

User key 540 is never present in non-volatile memory and is purged from volatile memory upon the conclusion of each session. In order for the user to make use of the system, user key 540 must be re-entered and recreated at the beginning of each session.

User Asymmetric Cryptographic Credential Generation

Upon the occurrence of an instantiating event such as the initial generation of user key 540, a random number generator 550 is actuated to generate a series of random numbers 560. Random numbers 560 generated by generator 550 are transferred to key generation module 530 across network 570, for example.

Key generation module 530 creates an asymmetric key pair consisting of a public key 561 and a private key 562 using random numbers 560. In various embodiments, key generation module 530 forwards a copy of public key 561 from the newly created key pair across network 570 which delivers it to an asymmetric key manager 580, which posts the key to its public keyring 581. In various embodiments, key generation module 530 further retrieves user key 540 from volatile memory and uses it as the key for encrypting private key 562 with a symmetric encryption algorithm. Upon completion of the encryption process, key generation module 530 delivers encrypted private key 592 across network 570 to a data persistence manager 590 for deposit into non-volatile memory 591 for storage. With the generation and storage of the user's public key 561 and encrypted private key 592, the system is provisioned to manage key material in a decentralized manner for a decentralized file system.

Datum-Specific Cryptographic Key Generation

As with traditional centralized data management systems, decentralized file systems require a means to securely generate and manage cryptographic keys. This problem is compounded in the decentralized model by the requirement to do so in the absence of a centralized key management capability. Additionally, because decentralized file systems often employ content-based addressing to locate information in lieu of the traditional location-based addressing, decentralized systems require a mechanism to generate cryptographic keys for each datum to be managed by the decentralized file system. A datum is defined herein as any file of any type managed within the context of the decentralized file system.

Figure 6:
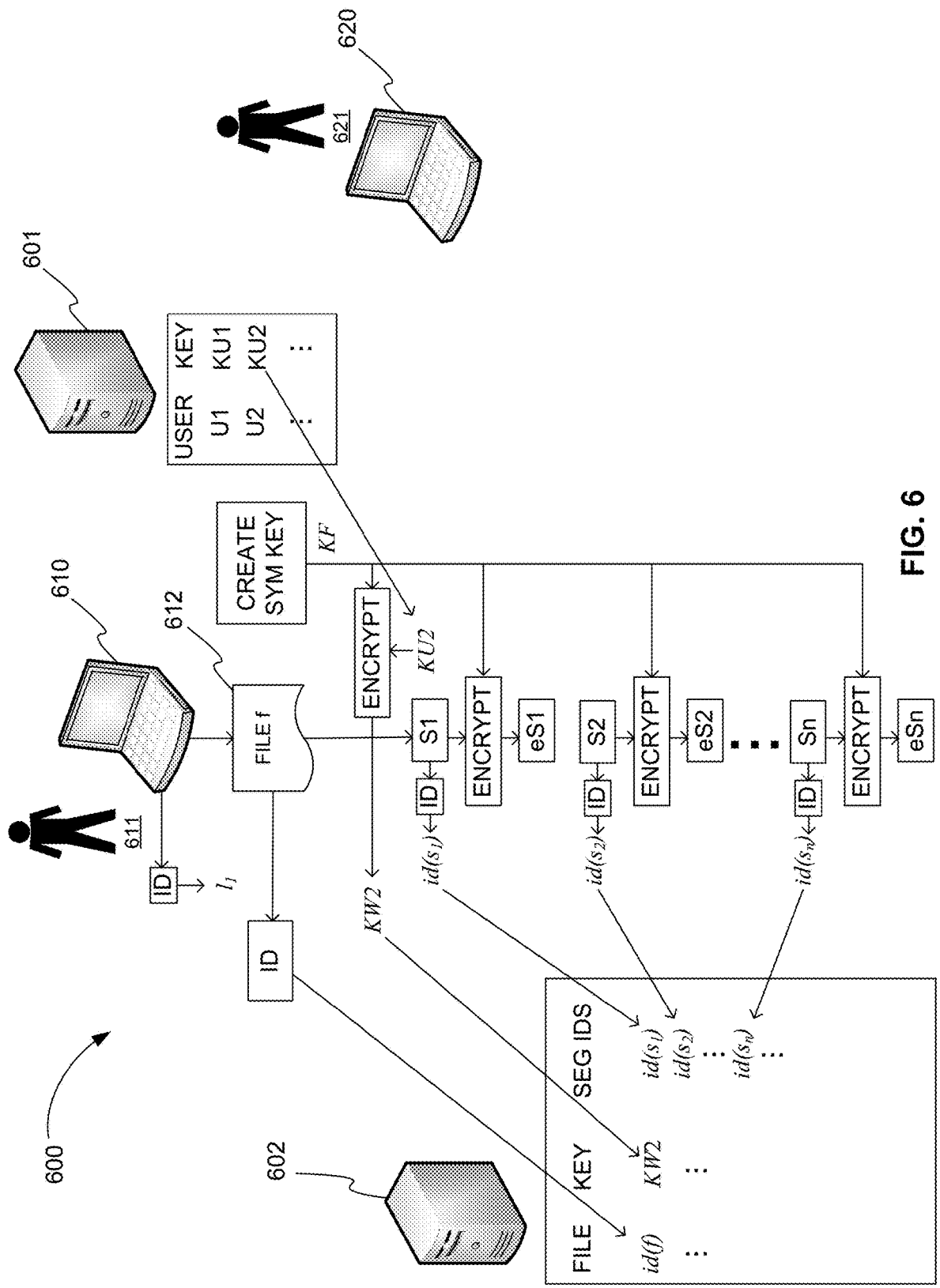
FIG. 6 is an exemplary diagram showing a system for securely sharing a file among peer devices in a distributed P2P filesystem, in accordance with various embodiments.

FIG. 6 is an exemplary diagram 600 showing a system for securely sharing a file among peer devices in a distributed P2P filesystem, in accordance with various embodiments. The system of FIG. 6 includes public-key server 601, content address server 602, and first peer device 610.

Public-key server 601 stores one or more public keys of an asymmetric cryptographic algorithm for one or more users. Public-key server 601 can be a computer service residing on any type of computer system including, but not limited to, the computer system of FIG. 1.

Content address server 602 stores information about one or more files. Like public-key server 601, content address server 602 can be a computer service residing on any type of computer system including, but not limited to, the computer system of FIG. 1.

First peer device 610 is a computer system of the distributed P2P filesystem that is used for sharing files or segments of files. A peer device is typically a client computing device, such as a laptop computer, desktop computer, tablet computer, or smartphone, but can be any type of computing device that executes a client application for sharing files in the distributed P2P file system. A peer device, for example, can be the computer system of FIG. 1.

First user 611, employing a data entry mechanism such as a keyboard or a pointing and selection mechanism such as a mouse issues an instruction to first peer device 610 capable of executing instruction sets via a productivity application such as a word processor or any other application that outputs a file 612, to output a file to a location managed by a decentralized file system.

When, for example, a first user 611 wants file f 612 to be sharable with a second user 621 of a second peer device 620, first peer device 610 performs several steps using a client application of the distributed P2P filesystem. First peer device 610 generates a unique identifier id(f) for file f 612 and stores the identifier id(f) on content address server 602. First peer device 610 can also, for example, store the identifier id(f) locally.

First peer device 610 divides file f 612 into n segments. First peer device 610 generates a unique identifier $id(s_i)$ for each segment $s_i$ of the n segments. First peer device 610 generates a symmetric encryption key KF for encrypting the n segments. In various embodiments, symmetric encryption key KF is generated upon initiation of the commitment instructions for file 612. For example, the client application or data encryption manager software of first peer device 610 intercepts the instruction and causes a random number generator (such as generator 550 of FIG. 5) to generate a new random string. The data encryption manager uses the random string as input from which an encryption key KF of the appropriate length is derived. The identifier id(f) is the unique key serial number for encryption key KF.

First peer device 610 encrypts each of the n segments using the symmetric key KF using a symmetric encryption algorithm, producing n encrypted segments. First peer device 610 stores each encrypted segment $es_i$ of the n segments with its identifier $id(s_i)$ on at least one peer device identified by a unique peer identifier $l_i$. In various embodiments and as shown in FIG. 6, the n encrypted segments are stored on first peer device 610, which is location $l_i$. For each encrypted segment $es_i$, first peer device 610 stores the identifier $id(s_i)$ on content address server 602 with the identifier id(f).

Datum-Specific Cryptographic Key Persistence

Once the datum being persisted has been successfully stored, the client application retrieves the key code of user 611 (such as key code 540 of FIG. 5) and uses it to encrypt symmetric key KF. Upon completion of the encryption of the new datum-specific encryption key, the client application delivers the encrypted key to a symmetric key manager (such as data persistence manager 590 of FIG. 5). The symmetric key manager stores encrypted symmetric key KF in such a manner that its serial number or identifier id(f) can be queried.

Local Data and Key Retrieval

In various embodiments, first user 611 requests file 612 via either the local file system or an application that is resident on first peer device 610 of the decentralized file system. This request is intercepted by the client application, which, requests file 612 from local storage. In parallel with the request for file 612, the client application queries content address server 602 file 612 by its identifier id(f). Upon identification of the encrypted symmetric key KF associated with the identifier id(f), the client application retrieves the encrypted symmetric key KF identified key from the symmetric key manager (again, such as data persistence manager 590 of FIG. 5). The client application retrieves the key code of user 611 and uses it to decrypt the encrypted symmetric key KF. After decryption of the encrypted symmetric key KF, the client application uses the symmetric key KF to decrypt each encrypted segment $es_i$ of the n segments. In various embodiments, upon decryption of the n encrypted segments, the data integrity of each segment or the reconstructed file is verified. If the decrypted datum's integrity is verified, the user's request is permitted to proceed. If the decrypted datum's integrity cannot be verified, the user's request is aborted.

Secure Data and Key Sharing Across a Decentralized Network

To share file 612 with second user 621, first peer device 610 retrieves from public-key server 601 a public key KU2 of second user 621 who can share file f 612, encrypts the symmetric key KF with the public key KU2 using an asymmetric encryption algorithm, producing wrapped key KW2=$EA_{KU2}$(KF), and stores the wrapped key KW2 on content address server 602 with the identifier id(f), for example. First peer device 610 can also or alternatively, for example, store the wrapped key KW2 on first peer device 610. Essentially, the information stored on content address server 602 for the identifier id(f) makes file f 612 sharable by second user 621 using second peer device 620.

System for Generating Persistent User Keys

Figure 7:
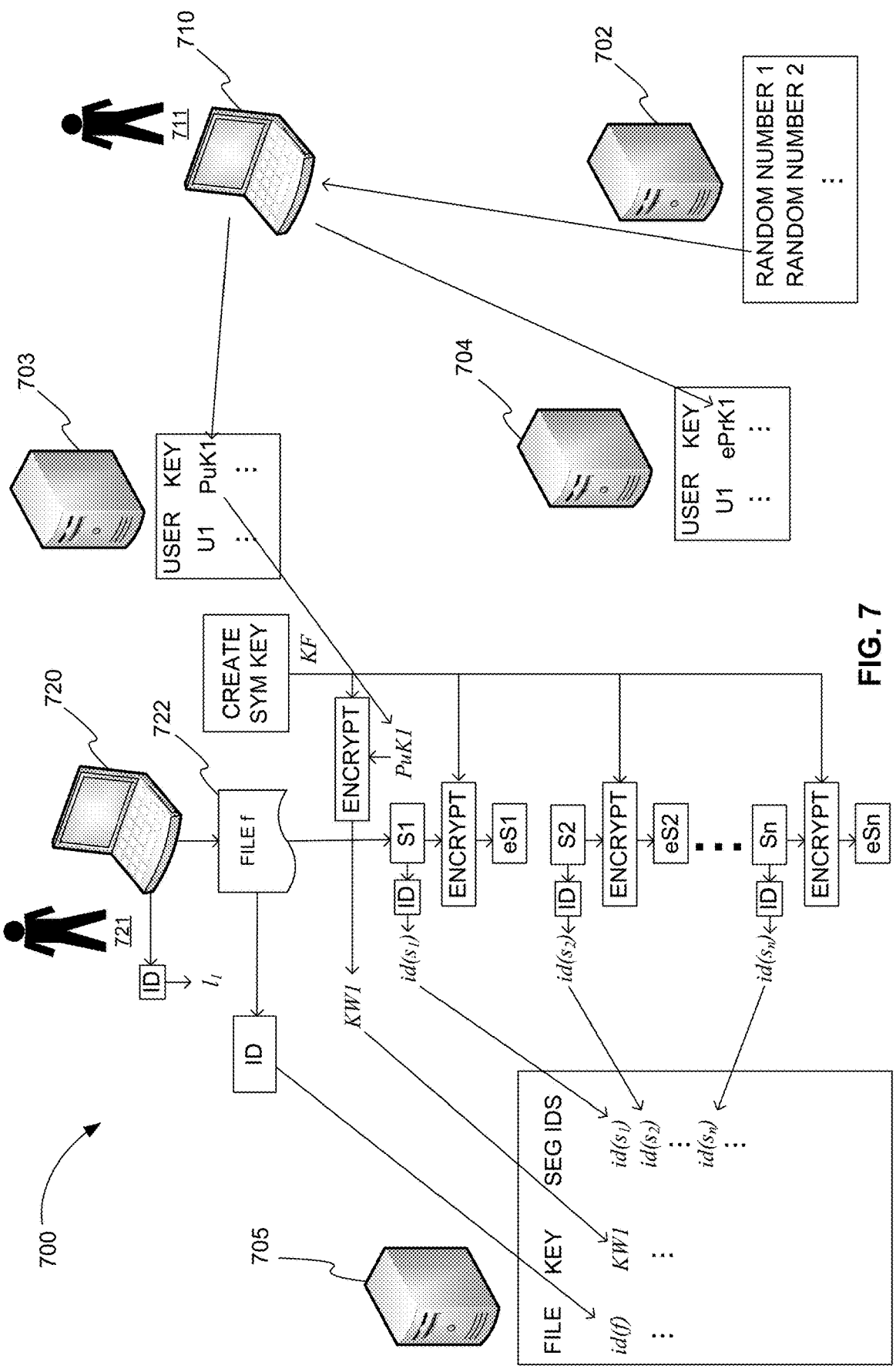
FIG. 7 is an exemplary diagram showing a system for generating persistent user cryptographic keys in a distributed P2P filesystem, in accordance with various embodiments.

FIG. 7 is an exemplary diagram 700 showing a system for generating persistent user cryptographic keys in a distributed P2P filesystem, in accordance with various embodiments. The system of FIG. 7 includes first peer device 710, random number generator server 702, public-key server 703, and data persistence server 704.

First peer device 710 of first user 711 is a computer system of the distributed P2P filesystem that is used for sharing files or segments of files. A peer device is typically a client computing device, such as a laptop computer, desktop computer, tablet computer, or smartphone, but can be any type of computing device that executes a client application for sharing files in the distributed P2P file system. A peer device, for example, can be the computer system of FIG. 1.

First peer device 710 receives a primary input value from first user 711. First peer device 710 generates a symmetric user encryption key UK1 for first user 711 from the primary input value. First peer device 710 requests and receives one or more random numbers from random number generator server 702.

Random number generator server 702 is a computer system of the distributed P2P filesystem that is used to generate random numbers. Random number generator server 702 can be a computer service residing on any type of computer system including, but not limited to, the computer system of FIG. 1.

First peer device 710 generates a user asymmetric encryption key pair that includes a public key PuK1 and a private key PrK1 for first user 711 from the one or more random numbers. First peer device 710 stores the public key PuK1 in a non-volatile memory on public-key server 703.

Public-key server 703 is a computer system of the distributed P2P filesystem that is used to store one or more public keys of an asymmetric cryptographic algorithm for one or more users. Public-key server 703 can be a computer service residing on any type of computer system including, but not limited to, the computer system of FIG. 1.

First peer device 710 encrypts the private key PrK1 using the symmetric user encryption key UK1 using a symmetric encryption algorithm, producing an encrypted private key ePrK1=$ES_{UK1}$(PrK1). First peer device 710 stores the private key ePrK1 in non-volatile memory on data persistence server 704.

Data persistence server 704 is a computer system of the distributed P2P filesystem that is used to store user information in non-volatile memory. Non-volatile memory includes, but is not limited to, flash memory, solid-state drive (SSD) memory, or magnetic hard disk drive (HDD) memory. Data persistence server 704 can be a computer service residing on any type of computer system including, but not limited to, the computer system of FIG. 1.

In various embodiments, the primary input value input comprises a password.

In various embodiments, first peer device 710 further receives a secondary input value from first user 711. The secondary input value can be, but is not limited to, a shared secret token or digitized information captured by a biometric sensor.

In various embodiments, first peer device 710 further generates the symmetric user encryption key UK1 for first user 711 from the primary input value and the secondary input value.

In various embodiments, first peer device 710 further only stores the symmetric user encryption key UK1 in volatile memory on first peer device 710. Volatile memory can include, but is not limited to, random access memory (RAM).

In various embodiments, first peer device 710 further purges the symmetric user encryption key UK1 from volatile memory on first peer device 710 when first user 711 logs off of a session on first peer device 710.

In various embodiments, a file can be shared with first user 711 using public key PuK1. For example, second peer device 720 of second user 721 generates a unique identifier id(f) for a file f 722 of second user 721 on second peer device 720 and stores the identifier id(f) on a content address server 705.

Content address server 705 is a computer system of the distributed P2P filesystem that is used to store information about one or more distributed files. Content address server 705 can be a computer service residing on any type of computer system including, but not limited to, the computer system of FIG. 1.

Second peer device 720 generates a symmetric encryption key KF for file f 722. Second peer device 720 divides file f 722 into n segments. Second peer device 720 generates a unique identifier id($s_i$) for each segment $s_i$ of the n segments. Second peer device 720 encrypts each segment $s_i$ of the n segments using the symmetric key KF using a symmetric encryption algorithm, producing n encrypted segments $es_i$=$ES_{KF}(s_i)$. Second peer device 720 stores each encrypted segment $es_i$ of the n segments with its identifier id($s_i$) on at least one peer device identified by a unique peer identifier $l_i$. For each encrypted segment $es_i$, second peer device 720 stores the identifier id($s_i$) on content address server 705 with the identifier id(f). Second peer device 720 retrieves from public-key server 703 the public key PuK1 of first user 711 who can share file f 722. Second peer device 720 encrypts the symmetric key KF with the public key PuK1 using an asymmetric encryption algorithm, producing wrapped key KW1=$EA_{PuK1}$(KF). Second peer device 720 stores the wrapped key KW1 on content address server 704 with the identifier id(f).

System for Decrypting Persistent User Keys

Figure 8:
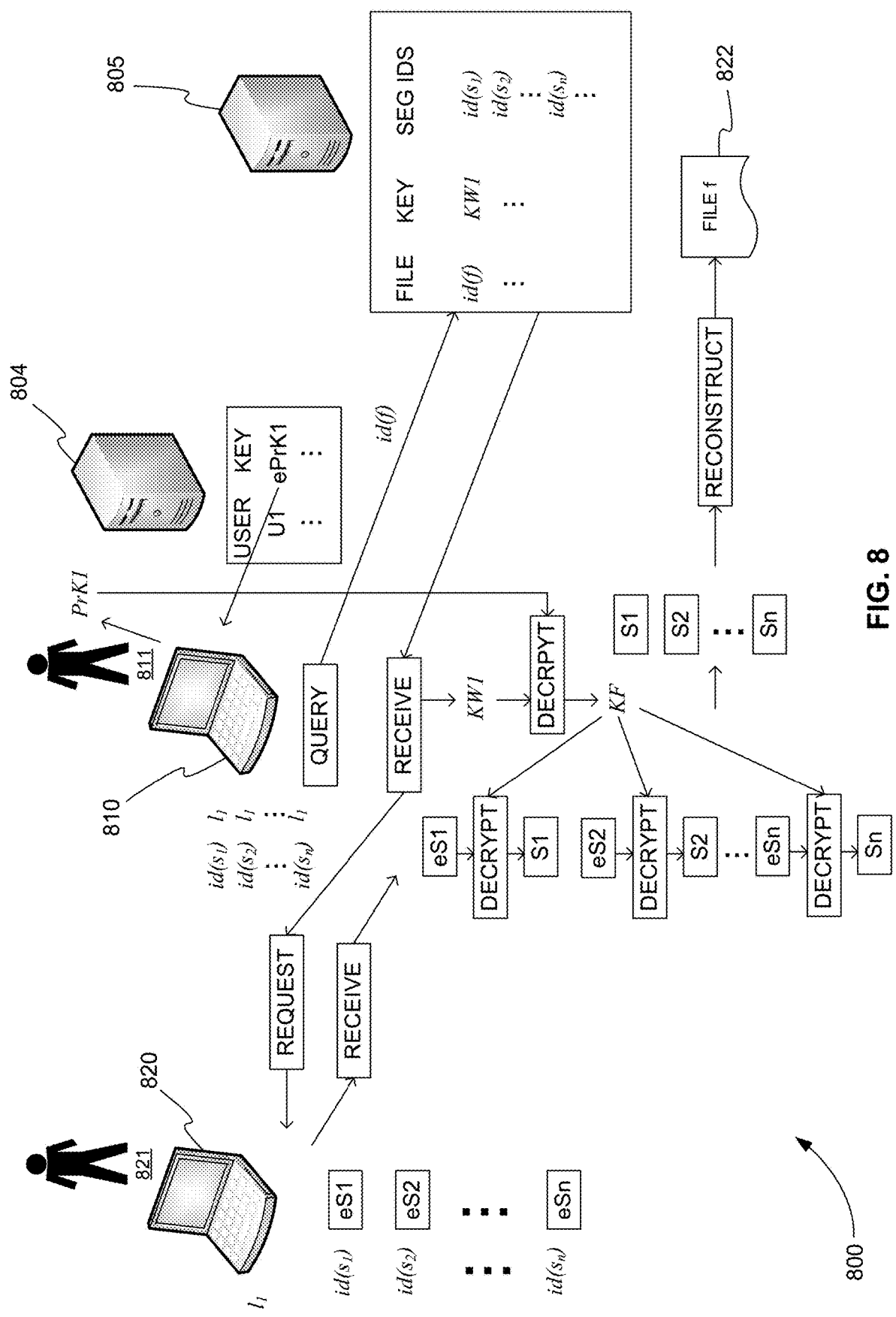
FIG. 8 is an exemplary diagram showing a system for decrypting persistent user cryptographic keys in a distributed cryptographically secured P2P filesystem, in accordance with various embodiments.

FIG. 8 is an exemplary diagram 800 showing a system for decrypting persistent user cryptographic keys in a distributed cryptographically secured P2P filesystem, in accordance with various embodiments. The system of FIG. 8 includes first peer device 810 and data persistence server 804.

First peer device 810 of first user 811 is a computer system of the distributed P2P filesystem that is used for sharing files or segments of files. A peer device is typically a client computing device, such as a laptop computer, desktop computer, tablet computer, or smartphone, but can be any type of computing device that executes a client application for sharing files in the distributed P2P file system. A peer device, for example, can be the computer system of FIG. 1.

First peer device 810 receives a primary input value from first user 811. First peer device 810 generates a symmetric user encryption key UK1 for first user 811 from the primary input value. First peer device 810 requests and receives an encrypted private key ePrK1 from a non-volatile memory of data persistence server 804.

Data persistence server 804 is a computer system of the distributed P2P filesystem that is used to store user information in non-volatile memory. Again, non-volatile memory includes, but is not limited to, flash memory, solid-state drive (SSD) memory, or magnetic hard disk drive (HDD) memory. Data persistence server 804 can be a computer service residing on any type of computer system including, but not limited to, the computer system of FIG. 1.

First peer device 810 decrypts the encrypted private key ePrK1 using the symmetric user encryption key UK1 using a symmetric decryption algorithm, producing a private key $PrK1=ES_{UK1}^{-1}(ePrK1)$.

In various embodiments, the primary input value input comprises a password.

In various embodiments, first peer device 810 further receives a secondary input value from first user 811. The secondary input value can be, but is not limited to, a shared secret token or digitized information captured by a biometric sensor.

In various embodiments, first peer device 810 further generates the symmetric user encryption key UK1 for first user 811 from the primary input value and the secondary input value.

In various embodiments, first peer device 810 further only stores the symmetric user encryption key UK1 in volatile memory on first peer device 810. Again, volatile memory can include, but it not limited to, random access memory (RAM).

In various embodiments, first peer device 810 further purges the symmetric user encryption key UK1 from volatile memory on first peer device 810 when first user 811 logs off of a session on first peer device 810.

In various embodiments, a file can be retrieved by first user 811 using private key PrK1. For example, first peer device 810 queries content address server 805 with a unique identifier id(f) of a file f 822 of a second user 821.

Content address server 805 is a computer system of the distributed P2P filesystem that is used to store information about one or more distributed files. Content address server 805 can be a computer service residing on any type of computer system including, but not limited to, the computer system of FIG. 1.

First peer device 810 receives from content address server 805 for the identifier id(f) at least one wrapped key KW1 and a unique identifier $id(s_i)$ and at least one peer identifier $l_i$ for each encrypted segment $es_i$ of n encrypted segments. First peer device 810 requests each encrypted segment $es_i$ identified by each received identifier $id(s_i)$ of at least m identifiers of the n encrypted segments, where m≤n, using a location of a peer device identified by the at least one peer identifier $l_i$ of each encrypted segment $es_i$. First peer device 810 receives the requested m encrypted segments from the request. First peer device 810 decrypts the at least one wrapped key KW1 with the private key PrK1 of first user 811 using an asymmetric encryption algorithm using the first peer device, producing symmetric key $KF=EA_{PrK1}^{-1}(KW1)$.

First peer device 810 decrypts each encrypted segment $es_i$ of the m received encrypted segments using the symmetric key KF using a symmetric encryption algorithm, producing a decrypted segment $s_i=ES_{KF}^{-1}(es_i)$ for each of the m received encrypted segments. First peer device 810 reconstructs file f 822 from the m decrypted segments.

Method for Generating Persistent User Keys

Figure 9:
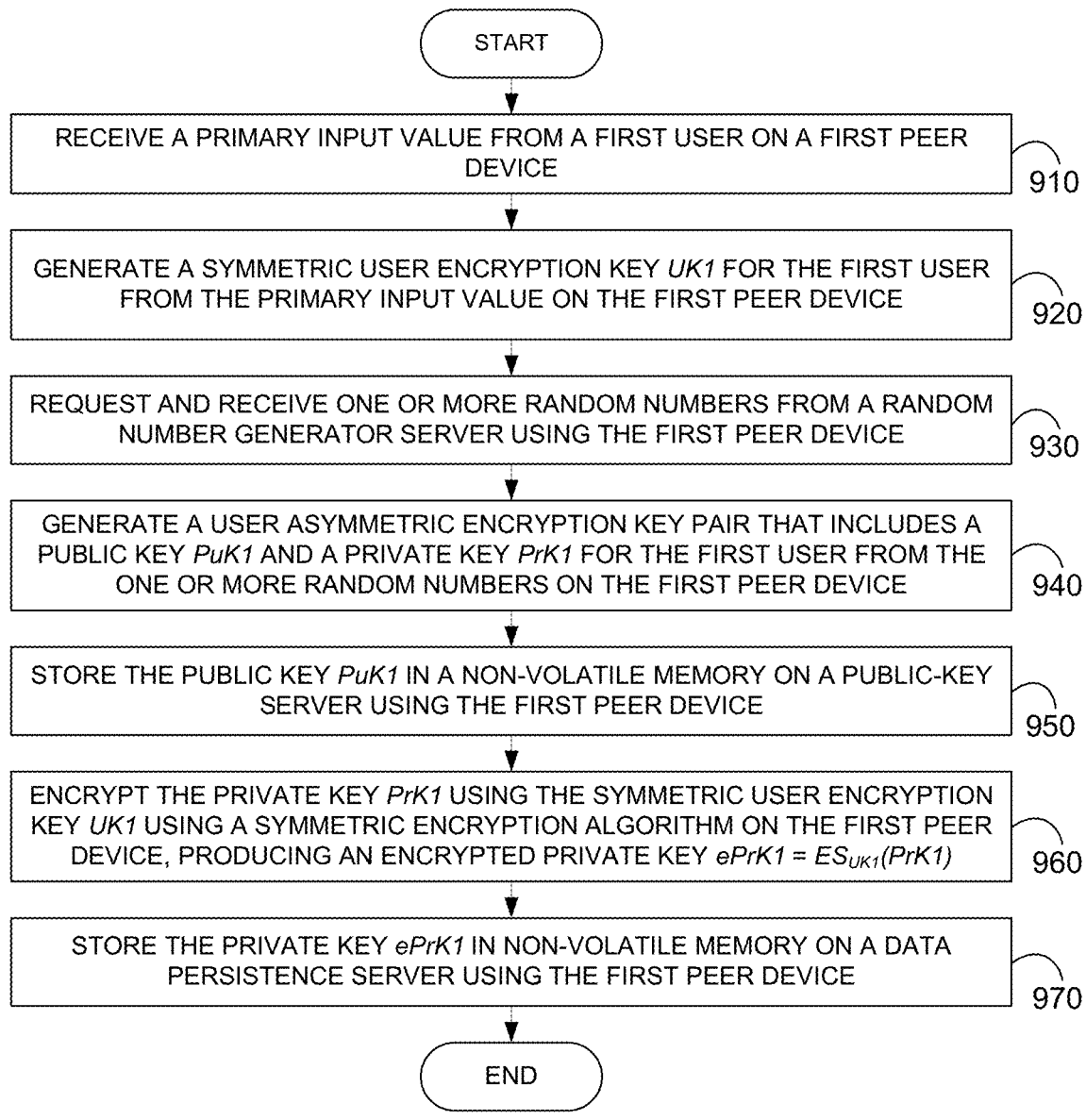
FIG. 9 is a flowchart showing a computer-implemented method for generating persistent user cryptographic keys in a distributed cryptographically secured P2P filesystem, in accordance with various embodiments.

FIG. 9 is a flowchart showing a computer-implemented method 900 for generating persistent user cryptographic keys in a distributed cryptographically secured P2P filesystem, in accordance with various embodiments.

In step 910 of method 900, a primary input value is received from a first user on a first peer device.

In step 920, a symmetric user encryption key UK1 is generated for the first user from the primary input value on the first peer device.

In step 930, one or more random numbers are requested and received from a random number generator server using the first peer device.

In step 940, a user asymmetric encryption key pair that includes a public key PuK1 and a private key PrK1 is generated for the first user from the one or more random numbers on the first peer device.

In step 950, the public key PuK1 is stored in a non-volatile memory on a public-key server using the first peer device.

In step 960, the private key PrK1 is encrypted using the symmetric user encryption key UK1 using a symmetric encryption algorithm on the first peer device, producing an encrypted private key $ePrK1=ES_{UK1}(PrK1)$.

In step 970, the private key ePrK1 is stored in non-volatile memory on a data persistence server using the first peer device.

Method for Decrypting Persistent User Keys

Figure 10:
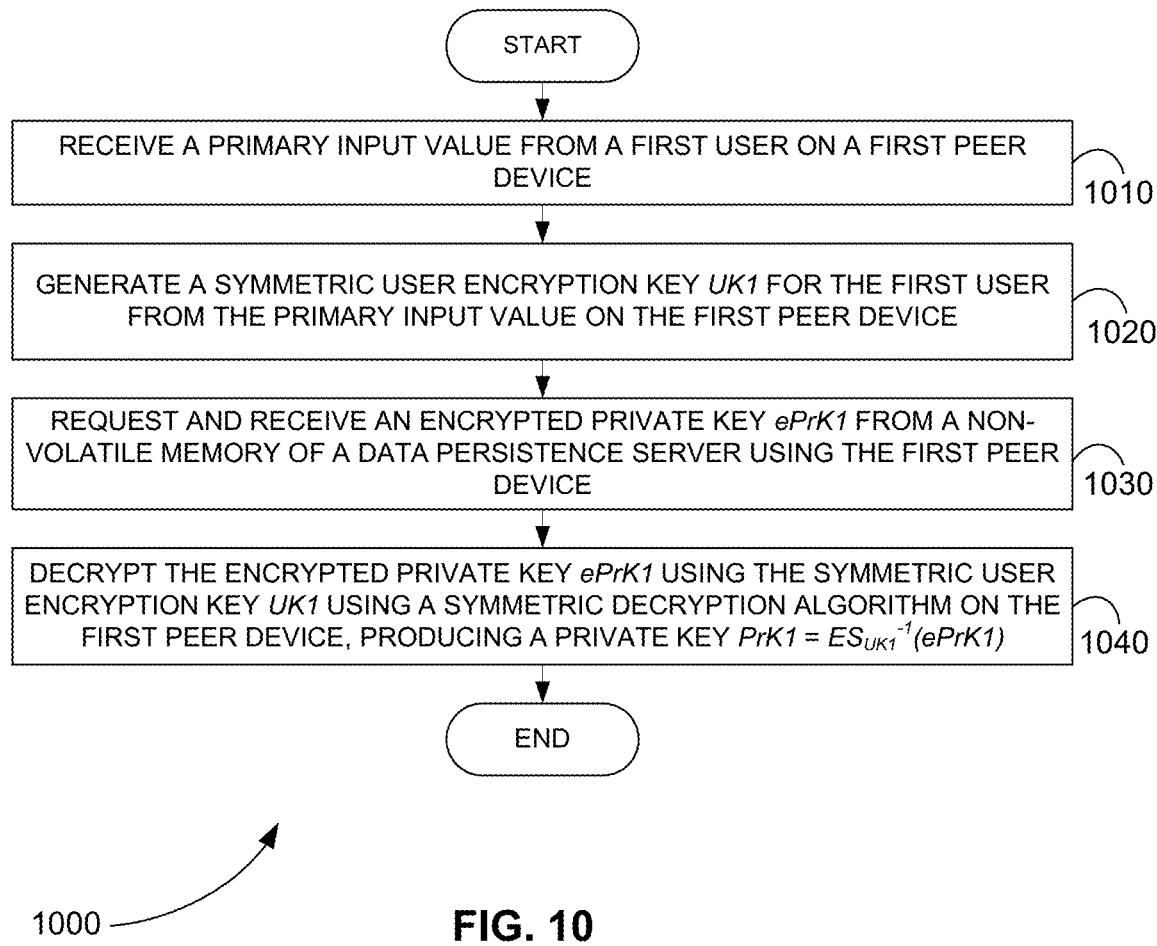
FIG. 10 is a flowchart showing a computer-implemented method for decrypting persistent user cryptographic keys in a distributed cryptographically secured P2P filesystem, in accordance with various embodiments.

FIG. 10 is a flowchart showing a computer-implemented method 1000 for decrypting persistent user cryptographic keys in a distributed cryptographically secured P2P filesystem, in accordance with various embodiments.

In step 1010 of method 1000, a primary input value is received from a first user on a first peer device.

In step 1020, a symmetric user encryption key UK1 is generated for the first user from the primary input value on the first peer device.

In step 1030, an encrypted private key ePrK1 is requested and received from a non-volatile memory of a data persistence server using the first peer device.

In step 1040, the encrypted private key ePrK1 is decrypted using the symmetric user encryption key UK1 using a symmetric decryption algorithm on the first peer device, producing a private key $PrK1=ES_{UK1}^{-1}(ePrK1)$.

While the present teachings are described in conjunction with various embodiments, it is not intended that the present teachings be limited to such embodiments. On the contrary, the present teachings encompass various alternatives, modifications, and equivalents, as will be appreciated by those of skill in the art.

Further, in describing various embodiments, the specification may have presented a method and/or process as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process should not be limited to the performance of their steps in the order written, and one skilled in the art can readily appreciate that the sequences may be varied and still remain within the spirit and scope of the various embodiments.

What is claimed is:

1. A computer-implemented method for generating persistent user cryptographic keys in a distributed cryptographically secured peer-to-peer filesystem, comprising:
   receiving a primary input value from a first user on a first peer device;
   generating a symmetric user encryption key UK1 for the first user from the primary input value on the first peer device;
   requesting and receiving one or more random numbers from a random number generator server using the first peer device;
   generating a user asymmetric encryption key pair that includes a public key PuK1 and a private key PrK1 for the first user from the one or more random numbers on the first peer device;
   storing the public key PuK1 in a non-volatile memory on a public-key server using the first peer device;
   encrypting the private key PrK1 using the symmetric user encryption key UK1 using a symmetric encryption algorithm on the first peer device, producing an encrypted private key ePrK1=$ES_{UK1}$(PrK1);
   storing the private key ePrK1 in non-volatile memory on a data persistence server using the first peer device;
   generating a unique identifier id(f) for a file f of a second user on a second peer device and storing the identifier id(f) on a content address server using the second peer device;
   generating a symmetric encryption key KF for the file f on the second peer device;
   dividing the file f into n segments on the second peer device;
   generating a unique identifier id($s_i$) for each segment $s_i$ of the n segments on the second peer device;
   encrypting each segment $s_i$ of the n segments using the symmetric key KF using a symmetric encryption algorithm on the second peer device, producing n encrypted segments $es_i$=$ES_{KF}(s_i)$;
   storing each encrypted segment $es_i$ of the n segments with its identifier id($s_i$) on at least one peer device identified by a unique peer identifier $l_i$ using the second peer device;
   for each encrypted segment $es_i$, storing the identifier id($s_i$) on the content address server with the identifier id(f) using the second peer device; and
   retrieving from the public-key server the public key PuK1 of the first user who can share the file f encrypting the symmetric key KF with the public key PuK1 using an asymmetric encryption algorithm, producing wrapped key KW1=$EA_{PuK1}$(KF), and storing the wrapped key KW1 on the content address server with the identifier id(f) using the second per device.

2. The method of claim 1, wherein the primary input value comprises a password.

3. The method of claim 1, further comprising receiving a secondary input value from the first user on the first peer device.

4. The method of claim 3, wherein the secondary input value comprises a shared secret token.

5. The method of claim 3, wherein the secondary input value comprises digitized information captured by a biometric sensor.

6. The method of claim 3, further comprising generating the symmetric user encryption key UK1 for the first user from the primary input value and the secondary input value on the first peer device.

7. The method of claim 1, further comprising only storing the symmetric user encryption key UK1 in volatile memory on the first peer device.

8. The method of claim 7, further comprising purging the symmetric user encryption key UK1 from volatile memory on the first peer device when the first user logs off of a session on the first peer device.

9. A system for generating persistent user cryptographic keys in a distributed cryptographically secured peer-to-peer filesystem, comprising:
   a random number generator server;
   a public-key server;
   data persistence server; and
   a first peer device of a first user that
      receives a primary input value from the first user;
      generates a symmetric user encryption key UK1 for the first user from the primary input value;
      requests and receives one or more random numbers from the random number generator server;
      generates a user asymmetric encryption key pair that includes a public key PuK1 and a private key PrK1 for the first user from the one or more random numbers;
      stores the public key PuK1 in a non-volatile memory on the public-key server;
      encrypts the private key PrK1 using the symmetric user encryption key UK1 using a symmetric encryption algorithm, producing an encrypted private key ePrK1=$ES_{UK1}$(PrK1);
      stores the private key ePrK1 in non-volatile memory on the data persistence server;
      generates a unique identifier id(f) for a file f of a second user on a second peer device and storing the identifier id(f) on a content address server using the second peer device;
      generates a symmetric encryption key KF for the file f on the second peer device;
      divides the file f into n segments on the second peer device;
      generates a unique identifier id($s_i$) for each segment $s_i$ of the n segments on the second peer device;
      encrypts each segment $s_i$ of the n segments using the symmetric key KF using a symmetric encryption algorithm on the second peer device, producing n encrypted segments $es_i$=$ES_{KF}(s_i)$;
      stores each encrypted segment $es_i$ of the n segments with its identifier id($s_i$) on at least one peer device identified by a unique peer identifier $l_i$ using the second peer device;
      for each encrypted segment $es_i$, stores the identifier id($s_i$) on the content address server with the identifier id(f) using the second peer device; and
      retrieves from the public-key server the public key PuK1 of the first user who can share the file f, encrypting the symmetric key KF with the public key PuK1 using an asymmetric encryption algorithm, producing wrapped key $KW1=EA_{PuK1}(KF)$, and storing the wrapped key KW1 on the content address server with the identifier id(f) using the second peer device.

10. The system of claim 9, wherein the primary input value comprises a password.

* * * * *